United States Patent
Matsushima et al.

(10) Patent No.: US 7,497,507 B2
(45) Date of Patent: Mar. 3, 2009

(54) BONNET FOR AUTOMOBILE

(75) Inventors: Shogo Matsushima, Iyo-gun (JP); Hiroshi Kiyama, Iyo-gun (JP)

(73) Assignee: Toray Industries, Inc. (JP)

( * ) Notice: Subject to any disclaimer, the term of this patent is extended or adjusted under 35 U.S.C. 154(b) by 42 days.

(21) Appl. No.: 11/661,449

(22) PCT Filed: Aug. 29, 2005

(86) PCT No.: PCT/JP2005/015647

§ 371 (c)(1),
(2), (4) Date: Feb. 28, 2007

(87) PCT Pub. No.: WO2006/025316

PCT Pub. Date: Mar. 9, 2006

(65) Prior Publication Data

US 2007/0257518 A1    Nov. 8, 2007

(30) Foreign Application Priority Data

Aug. 31, 2004    (JP)  .............................. 2004-252403

(51) Int. Cl.
*B60J 7/00*    (2006.01)
(52) U.S. Cl. .................. 296/193.11; 296/191
(58) Field of Classification Search ............ 296/193.11, 296/181.2, 187.04, 191, 901.01
See application file for complete search history.

(56) References Cited

U.S. PATENT DOCUMENTS

| 4,598,008 A | * | 7/1986 | Vogt et al. .................. 428/117 |
| 5,000,997 A | * | 3/1991 | Ritchie et al. ................ 428/78 |
| 5,605,371 A | * | 2/1997 | Borchelt et al. ......... 296/187.09 |
| 6,386,623 B1 | * | 5/2002 | Ryan et al. ............. 296/187.04 |
| 6,824,202 B2 | * | 11/2004 | Vismara et al. ........ 296/193.11 |
| 7,059,665 B2 | * | 6/2006 | Murai et al. ............. 296/181.2 |
| 7,228,929 B2 | * | 6/2007 | Yiu .......................... 180/69.21 |
| 7,270,367 B2 | * | 9/2007 | Mairing ................. 296/193.11 |
| 2006/0163915 A1 | * | 7/2006 | Ikeda et al. ............ 296/193.11 |
| 2006/0220418 A1 | * | 10/2006 | Behr et al. ............. 296/187.04 |

FOREIGN PATENT DOCUMENTS

| JP | 62085767 A | * | 4/1987 |
| JP | 02063724 A | * | 3/1990 |
| JP | 08-01180 Y2 | | 1/1996 |
| JP | 2002-284038 A | | 10/2002 |
| JP | 2003-146252 A | | 5/2003 |

* cited by examiner

*Primary Examiner*—Joseph D Pape
(74) *Attorney, Agent, or Firm*—DLA Piper LLP (US)

(57) ABSTRACT

A bonnet for an automobile, having an outer member made from FRP and an inner member made from FRP and joined to the back-surface side of the outer member, wherein the outer member has a high-rigidity section having a rigidity higher than a rigidity of the central section of the outer member along an outer edge of the outer member, and the inner member is joined to the outer member at the high-rigidity section. While being achieved an advantage of weight lightening of the bonnet by making it from FRP, the rigidity at a required portion is efficiently increased without damaging moldability, a design feature of the bonnet surface can be maintained at a good level, and in addition, performance of the bonnet relating to the protection of a pedestrian at a collision accident etc. can also be sufficiently enhanced.

19 Claims, 3 Drawing Sheets

BONNET FOR AUTOMOBILE

RELATED APPLICATION

This is a §371 of International Application No. PCT/JP2005/015647, with an international filing date of Aug. 29, 2005 (WO 2006/025316 A1, published Mar. 9, 2006), which is based on Japanese Patent Application No. 2004-252403, filed Aug. 31, 2004.

TECHNICAL FIELD

The technology in this disclosure relates to a bonnet for an automobile made from an FRP (fiber reinforced plastic), and specifically, relates to a bonnet for an automobile capable of obtaining a required rigidity and an excellent surface design feature while maintaining a small weight as a whole.

BACKGROUND

Recently, FRP bonnets for automobiles have been developed for a first purpose of weight lightening, and various structures are proposed aiming mainly to increase the strength and the rigidity of a required portion (for example, JP-A-2003-146252). An FRP bonnet is usually formed from an outer member with a high rigidity provided at a surface side and an inner member joined to the back-surface side of the outer member which has a stiffener structure with, for example, a hat shape in cross section. The high rigidity of the outer member is obtained, for example, by forming it thick or forming it as a sandwich structure in which a core material is interposed between FRP skin plates.

However, in a case where an outer member is formed thick, the weight thereof greatly increases, an advantage achieved by a bonnet with FRP is lost. On the other hand, if a sandwich structure is employed, although a high advantage of weight lightening can be obtained, when a large-area member such as a bonnet is molded as a sandwich structure over the entire area, it can be molded relatively easily in a case where the core material is thin, but the core material has to be formed thick in order to obtain a high rigidity, and therefore, the molding is associated with a fairly great difficulty from the viewpoint of giving a shape to the core material and processing the core material.

Further, although it is considered that the outer member is formed thin by designing the rigidity of the FRP inner member high and making the inner member exhibit a main rigidity of the bonnet, in this case, a line-like deformation due to a difference in rigidity, a so-called bonding line, frequently appears at a portion on a surface-side design surface of the outer member which corresponds to a joining portion between the thin outer member and the high-rigidity inner member, and the design feature of the surface may be damaged.

By the way, separately from the above-described problems in an FRP bonnet concerning weight lightening, providing of a required rigidity, easiness of molding, bonding line, etc., recently, enhancement of safety at a collision accident etc. has been required for an automobile, in particular, enhancement of performance for protecting a pedestrian at a collision accident etc. has been required, and in order to enhance this function as highly as possible, an excellent impact absorbing function has been required. When an automobile collides with a pedestrian, the pedestrian receives an impact load on the leg or the head against a front portion, a bonnet, etc. of the automobile, and particularly, in order to reduce deadly accidents, it is said that it is inevitable to reduce a damage to the head. With respect to this reduction of the damage to the head, a regulation value as an impact relaxation performance of a bonnet is being standardized, and in particular, a head injury criterion (HIC), which is calculated by an acceleration received by the head and the duration thereof, is required to be suppressed at a predetermined value or less.

Accordingly, paying attention to the above-described circumstances, it could be advantageous to provide a bonnet made from FRP for an automobile which can increase a rigidity of a required portion without damaging moldability while maintaining an advantage of weight lightening of the bonnet by making it from FRP, can maintain a design feature of the surface at a good level, and in addition, can sufficiently enhance the performance relating to protection of a pedestrian at a collision accident etc.

SUMMARY

We found that the above-described problems can be addressed by increasing a rigidity of a portion positioned along an outer edge of an FRP bonnet. The idea can be applied to a single-plate FRP bonnet, and can also be applied to an FRP bonnet having a structure joining an FRP outer member and an FRP inner member. In particular, by employing the latter FRP bonnet, a further excellent advantage can be obtained.

Namely, a bonnet for an automobile is made from FRP, and a high-rigidity section having a rigidity higher than a rigidity of a central section of the bonnet is provided to the bonnet along an outer edge of the bonnet. This structure of the bonnet for an automobile is applied mainly to a single-plate FRP bonnet.

In such a bonnet for an automobile, a structure can be employed wherein the whole of the FRP bonnet including the high-rigidity section is integrally molded.

Further, a structure may be employed wherein the high-rigidity section is provided along the outer edge of the bonnet over its entire circumference, and a structure may also be employed wherein the high-rigidity section is partially provided along the outer edge of the bonnet.

The above-described high-rigidity section can be formed, for example, as a thickness increased section in which a number of lamination of reinforcing fiber layers for FRP is increased. Alternatively, the high-rigidity section can be formed as a sandwich structure in which a core material is interposed between FRP skin plates.

Further, a structure can be employed wherein at least a portion other than the high-rigidity section is formed from an FRP single plate, and a structure can also be employed wherein at least a portion other than the high-rigidity section is formed as a sandwich structure in which a core material is interposed between FRP skin plates.

It is preferred that the FRP bonnet is made from a carbon fiber reinforced plastic, for example, to easily give a predetermined rigidity to the whole of the bonnet. Further, to reduce an acceleration applied to the head of a pedestrian at a collision accident etc. and to provide a desirable impact absorbing performance, it is further preferred that a woven fabric of carbon fibers with a high elongation is used for the carbon fiber reinforced plastic.

Further, a bonnet for an automobile has an outer member made from FRP and an inner member made from FRP and joined to a back-surface side of the outer member, wherein the outer member has a high-rigidity section having a rigidity higher than a rigidity of a central section of the outer member along an outer edge of the outer member, and the inner member is joined to the outer member at the high-rigidity section.

Namely, the idea is applied to an FRP bonnet having a joining structure of FRP outer and inner members.

In this bonnet for an automobile, a structure can be employed wherein the whole of the FRP outer member including the high-rigidity section is integrally molded.

Further, a structure may be employed wherein the high-rigidity section is provided along the outer edge of the outer member over its entire circumference, and a structure may also be employed wherein the high-rigidity section is partially provided along the outer edge of the outer member.

The above-described high-rigidity section can be formed, for example, as a thickness increased section in which a number of lamination of reinforcing fiber layers for FRP is increased. Alternatively, the high-rigidity section can be formed as a sandwich structure in which a core material is interposed between FRP skin plates.

Further, a structure can be employed wherein at least a portion other than the high-rigidity section (that is, a central portion of the outer member) is formed from an FRP single plate, and a structure can also be employed wherein at least a portion other than the high-rigidity section is formed as a sandwich structure in which a core material is interposed between FRP skin plates.

In this bonnet for an automobile, for example, in order to easily give a predetermined rigidity to the whole of the bonnet, it is preferred that the FRP outer member is made from a carbon fiber reinforced plastic. Further, in order to reduce an acceleration applied to the head of a pedestrian at a collision accident etc. and to provide a desirable impact absorbing performance, it is further preferred that a woven fabric of carbon fibers with a high elongation is used for the carbon fiber reinforced plastic.

For the above-described inner member, a structure can be employed wherein the inner member extends along the high-rigidity section over the entire circumference of the outer member, and a structure can also be employed wherein the inner member partially extends along the high-rigidity section.

For the inner member, for example, a stiffener structure formed in a hat shape in cross section can be employed.

To increase an attachment rigidity, a torsional rigidity and/or a plane rigidity as basic structures of a bonnet for an automobile, also with respect to a low-rigidity section at a central portion of the bonnet, relatively high-rigidity part and low-rigidity part may be provided within the section. Where, the meaning of the attachment rigidity, the torsional rigidity and the plane rigidity as basic structures of a bonnet are as follows.

Attachment Rigidity:

There is a case where a bonnet is deformed by receiving a pulling force of a striker or a reaction force from seal members and the like, when the bonnet is attached to a vehicle body. It is necessary to have a predetermined rigidity so that the deformation does not cause an inconvenience in dimensional relationship between the bonnet and adjacent other parts (lack in clearance, occurrence of interference, occurrence of a step or a gap of an outer surface more than a regular dimension, etc.) or a nonuniformity of a design surface of an outer plate (such as a distortion of a design surface). This rigidity is called as an attachment rigidity. Since a bonnet is attached to a vehicle body at its rear end part via a hinge member and it is applied with an attachment load at its front end part by an opening/closing member such as a striker, the attachment rigidity is determined mainly by a flexural rigidity in the vertical direction of the bonnet.

Torsional Rigidity:

A bonnet has a structure wherein one side of the bonnet is supported by a support rod and the like so as to be left at a predetermined opening position when the bonnet is opened. At that time, even if a torsional force is applied to the bonnet by a hand or a gust and the like, to prevent a stopping device such as a support rod from getting out from the bonnet by a great deformation of the bonnet, a predetermined torsional rigidity is required. Further, because left-hand and right-hand attachment reaction forces (a pulling force of a striker, a reaction force from a seal member and the like, etc.) are not always same as each other at the time of attachment to a vehicle body, a force (a moment) distorting the bonnet in left/right directions may occur at the time of attachment to the vehicle body. Therefore, the torsional rigidity is a necessary property also as a part of an attachment rigidity.

Plane Rigidity:

If the rigidity of a bonnet plane is poor, at a time such as one when the upper surface of the bonnet is pressed by a hand, the portion pressed may be greatly deformed. Further, the upper surface of the bonnet may be deformed so as to be waved by a variation of a wind pressure at the time of high-speed running. Therefore, to prevent such an inconvenience, a predetermined plane rigidity is required for an upper surface of a bonnet.

In such an FRP bonnet for an automobile, because the high-rigidity section is provided along the outer edge of the FRP bonnet at a picture frame-like shape while a light weight is maintained as a whole, a rigidity necessary as a whole can be easily ensured. In particular, in the joining structure of FRP outer and FRP inner members, because the high-rigidity section is provided on the outer member, it becomes possible to form a central portion of the outer member, namely, a main structural portion of the outer member, as an FRP single plate structure or a sandwich structure in which a thin core material is interposed between FRP skin plates, substantially over the entire area of the portion of the outer member, it can be easily molded even in a case of a large area, and the advantage of weight lightening can be exhibited as much as possible. Moreover, in this case, because the joining of the inner member is carried out at the high-rigidity section, appearance of a so-called bonding line on the surface side of the outer member can be easily prevented, and the design feature of the surface of the outer member can be improved. Furthermore, since the central portion of the FRP bonnet, particularly, the central portion of the FRP outer member, can be formed to be appropriately low in rigidity while the form of the whole of the bonnet is properly maintained by the high-rigidity section present on the circumferential edge portion, when an impact load is applied to this central portion, a structure capable of absorbing the impact energy while being displaced at a condition such as a kind of a hammock can be realized, and it becomes possible to protect a head of a pedestrian at the time of collision accident etc. more properly.

In the bonnet for an automobile, by providing the high-rigidity section along the outer edge of the bonnet at a picture frame-like shape, while a light weight is maintained as a whole, a necessary rigidity can be efficiently provided. Further, it becomes possible to employ a structure capable of being easily molded for the central portion of the FRP bonnet, in particular, for the central portion of the outer member, such as an FRP single plat structure or a sandwich structure in which a thin core material is interposed between FRP skin plates, and the molding of an FRP bonnet with a large area can be facilitated. Further, in the outer/inner members joining structure, by carrying out the joining at the high-rigidity section, occurrence of a bonding line can be prevented and the design feature of the surface of the outer member can be improved. Furthermore, because an optimum structure with respect to impact energy absorbing performance can be easily employed on the central portion of the bonnet, the performance for protecting a pedestrian at the time of collision accident etc. can be enhanced more surely.

Figure 1:
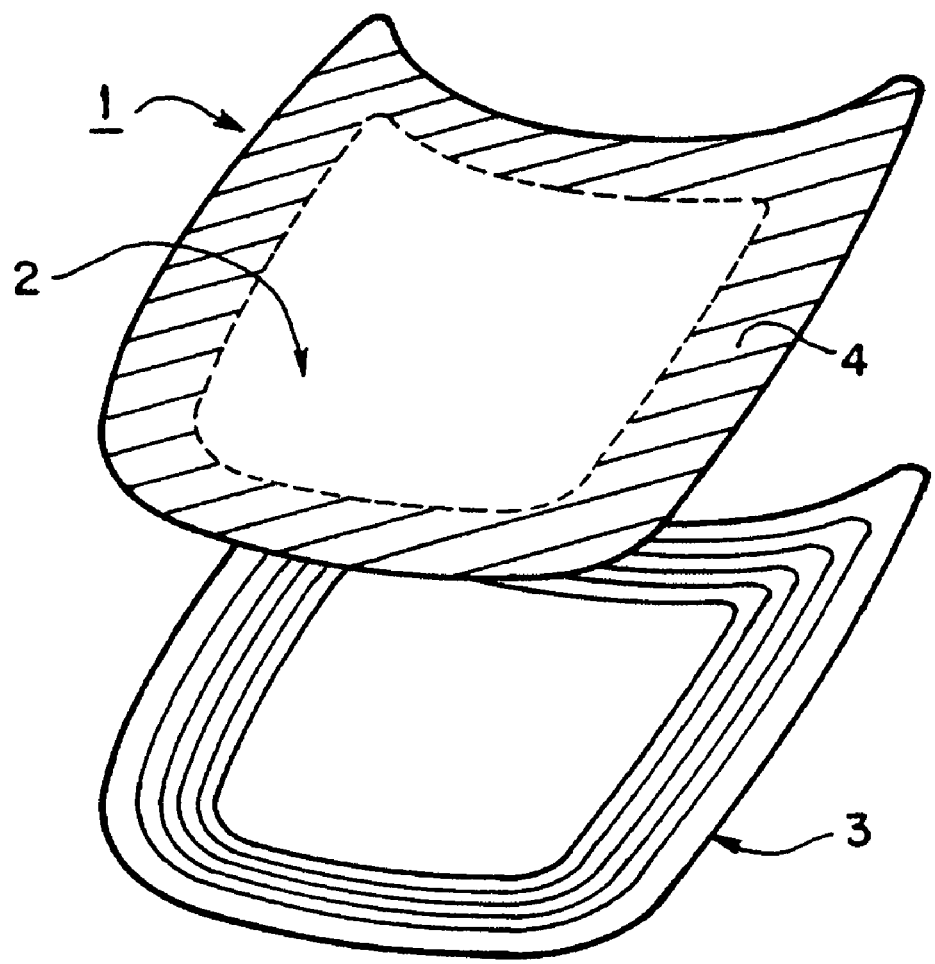
FIG. 1 is an exploded perspective view of a bonnet for an automobile according to an embodiment.

1, 21: bonnet for automobile
2, 2a, 2b: FRP outer member
3, 3a, 3b: FRP inner member
4, 4a, 4b, 12, 22: high-rigidity section
5a, 5b: FRP skin plate
6, 11, 14: core material
13: FRP single plate structure portion
15: sandwich structure portion
23: low-rigidity portion
24, 25, 26, 27: relatively high-rigidity portion

DETAILED DESCRIPTION

Hereinafter, desirable embodiments will be explained referring to the figures:

The bonnet for an automobile can be molded as a single-plate structure, and can also be formed as a joining structure of FRP outer and FRP inner members. FIG. 1 shows a bonnet for an automobile according to an embodiment, and particularly shows an example wherein the structure is applied to a bonnet for an automobile having an FRP outer member and an FRP inner member joined to the back-surface side of the outer member. In FIG. 1, symbol 1 shows the whole of the bonnet for an automobile, and the bonnet 1 comprises an outer member 2 made from FRP and positioned at a surface side, and an inner member 3 made from FRP joined to the back-surface side of the outer member. FRP outer member 2 is spread in a plane direction over the entire surface of the bonnet, and formed as a curved shape required depending upon the kind of automobile. This outer member 2 may be formed as an FRP single plate structure, or may be formed as a sandwich structure in which a core material (for example, a core material formed from a foamed material) is interposed between FRP skin plates.

To FRP outer member 2, a high-rigidity section 4 having a rigidity higher than a rigidity of a central section of the outer member 2 is provided along the outer edge of the outer member 2. In this embodiment, although high-rigidity section 4 is formed as a picture frame-like shape along the entire circumference of outer member 2, it may be partially provided only at required portions along the outer edge of the outer member 2. FRP inner member 3 is provided at a portion corresponding to this high-rigidity section 4, and in this embodiment, inner member 3 is provided at a picture frame-like shape along the outer edge of outer member 2 over its entire circumference, similarly to high-rigidity section 4. This FRP inner member 3 is joined to FRP outer member 2 at the above-described high-rigidity section 4.

Figure 2:
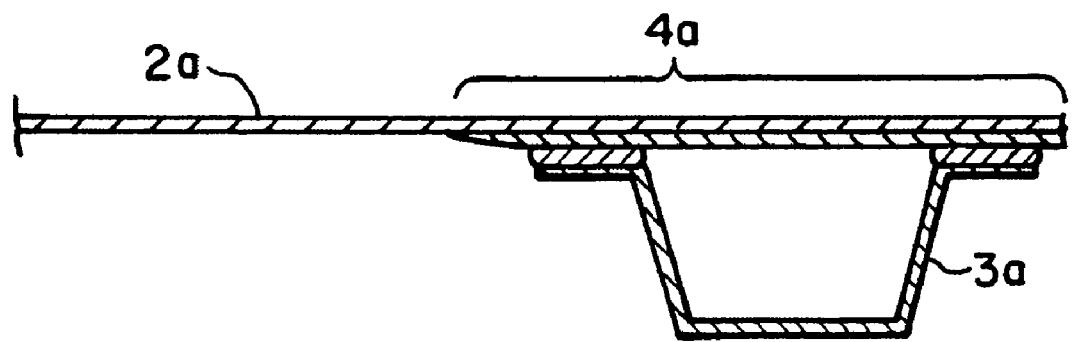
FIG. 2 is a partial sectional view showing an example of a structure of a high-rigidity section of the bonnet for an automobile depicted in FIG. 1.
Figure 3:
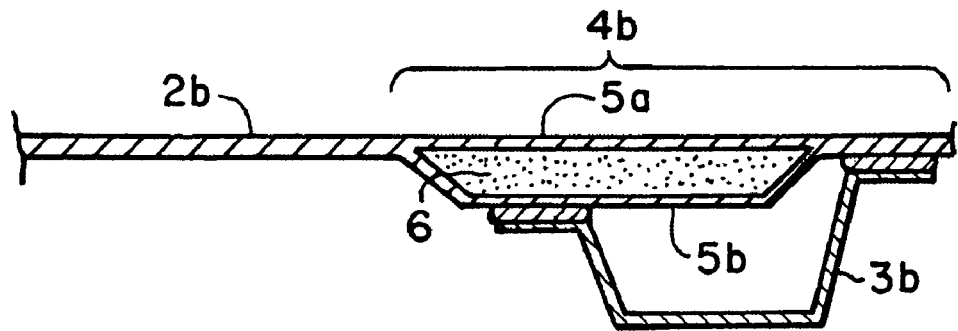
FIG. 3 is a partial sectional view showing another example of a structure of a high-rigidity section of the bonnet for an automobile depicted in FIG. 1.

The above-described high-rigidity section 4 can be formed, for example, as shown in FIGS. 2 and 3. In the structure shown in FIG. 2, high-rigidity section 4a is formed by making it as a thickness increased portion formed, by increasing the thickness of outer member 2a made from an FRP single plate at its outer edge portion, for example, by partially increasing the number of lamination of reinforcing fiber layers for FRP. In the structure shown in FIG. 3, high-rigidity section 4b is formed by making outer member 2b, basically formed as an FRP single plate, as a sandwich structure in which a core material 6 is interposed between FRP skin plates 5a and 5b, partially at the outer edge portion of outer member 2b.

As shown in FIGS. 2 and 3, FRP inner members 3a and 3b are joined to FRP outer members 2a and 2b at the above-described high-rigidity sections 4a and 4b, respectively. Each of these inner members 3a and 3b is formed as a stiffener structure having a hat shape in cross section, for example, as shown in the figures. Further, as aforementioned, these inner members 3a and 3b may extend along high-rigidity sections 4a and 4b over their entire circumferences, and also may extend partially.

Figure 4:
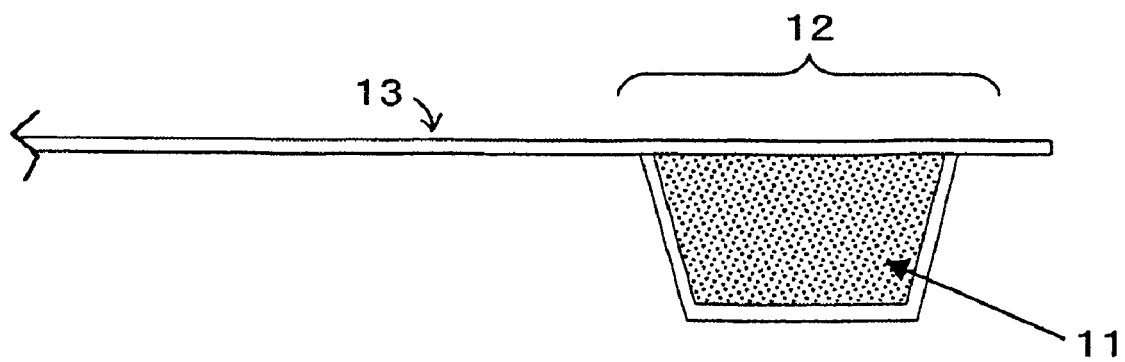
FIG. 4 is a partial sectional view of a bonnet for an automobile showing an example of a structure of a section other than a high-rigidity section.
Figure 5:
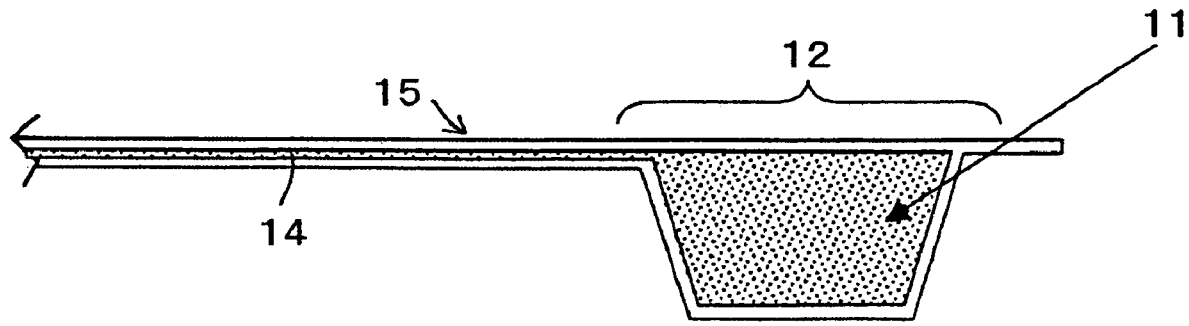
FIG. 5 is a partial sectional view of a bonnet for an automobile showing another example of a structure of a section other than a high-rigidity section.

At least a portion other than the above-described high-rigidity section can be formed, for example, as an FRP single plate structure or a sandwich structure in which a thin core material is interposed between FRP skin plates. For example, as shown in FIGS. 4 and 5, in an FRP bonnet (in a case of joining structure of outer and inner members, an FRP outer member), for example, in a case where a high-rigidity section 12 having a core material 11 is provided, the portion other than the high-rigidity section 12 can be formed as an FRP single plate structure portion 13 or a sandwich structure portion 15 in which a thin core material 14 is interposed between FRP skin plates.

In the bonnet for an automobile formed as shown in FIGS. 1 to 3, by providing high-rigidity section 4 at a picture frame-like shape along the outer edge of FRP outer member 2 which basically has an FRP single plate structure, while a light weight can be ensured as a whole, a required rigidity can be efficiently provided, and even in a case of an outer member having a large area, it can be easily molded. Further, by providing high-rigidity section 4 selectively at a joining portion with inner member 3 while exhibiting the advantage of weight lightening due to thin outer member 2 as much as possible, even if members having a great difference in rigidity are joined to each other, it is possible to prevent a bonding line from appearing on the surface of outer member 2, and the design feature of the bonnet surface can be improved. Furthermore, by providing high-rigidity section 4 at a picture frame-like shape, the central portion of outer member 2 can be formed as a kind of hammock by making it appropriately low in rigidity, and the performance for absorbing an external impact energy can be efficiently enhanced. In particular, by using carbon fibers as the reinforcing fibers for the FRP of outer member 2, the weight lightening and ensuring the rigidity can be achieved at a good level, and by using high-elongation carbon fibers, particularly by using a woven fabric of high-elongation carbon fibers, the impact absorbing performance can be further enhanced.

Figure 6:
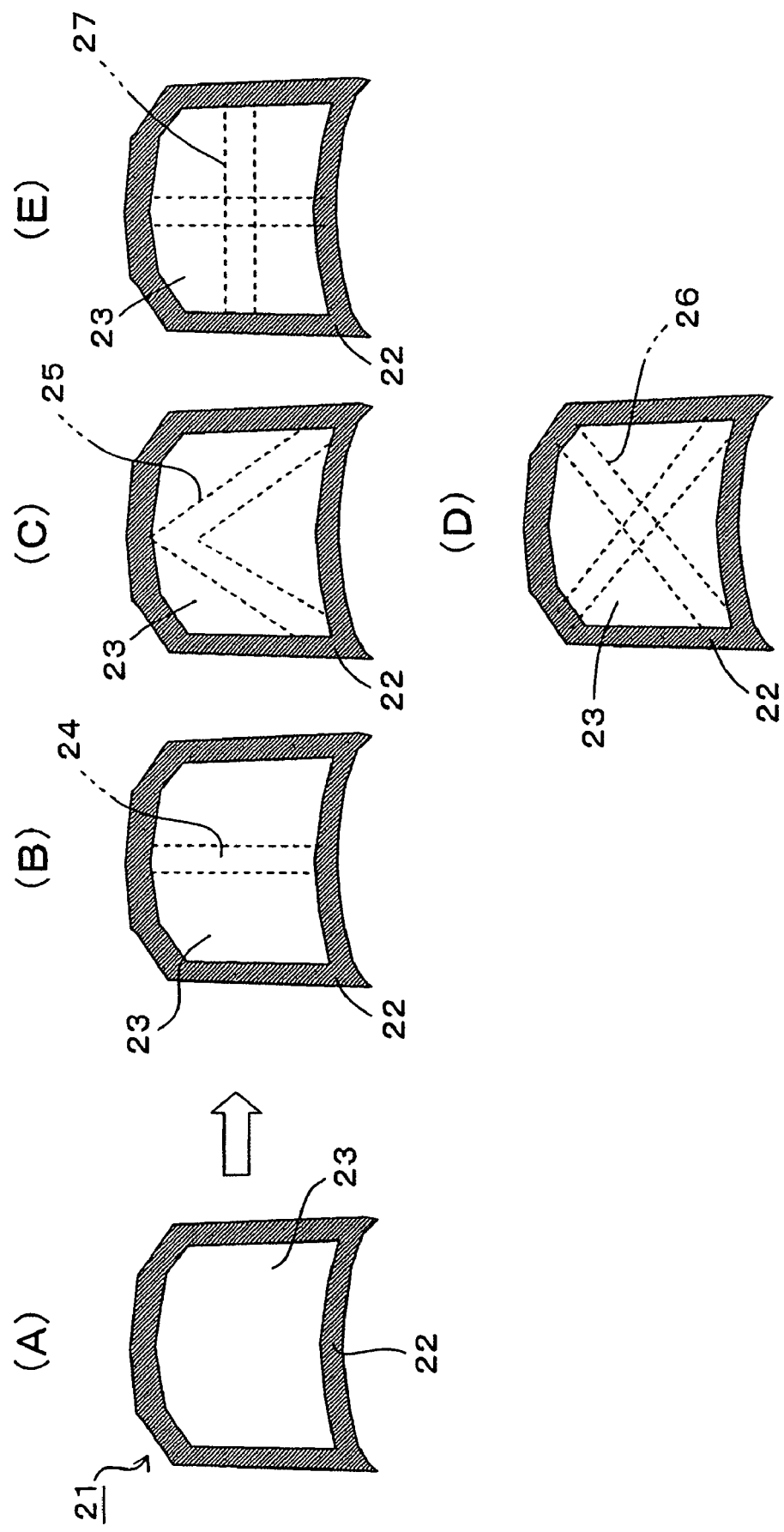
FIG. 6 shows plan views of bonnets for automobiles, showing various examples of structures each provided with a relatively high-rigidity portion in a low-rigidity portion.

As aforementioned, in order to increase an attachment rigidity, a torsional rigidity and/or a plane rigidity as basic structures of the bonnet for an automobile, also with respect to a low-rigidity section at a central portion of the bonnet, relatively high-rigidity part and low-rigidity part may be provided within the low-rigidity section. Concretely, for example, a structure shown in FIG. 6 can be employed.

For example, with respect to a bonnet for an automobile 21 having a high-rigidity section 22 at its edge portion and a low-rigidity section 23 at its central portion shown in FIG. 6(A), as shown in FIG. 6(B), by providing a relatively high-rigidity portion 24, extending in the front/rear direction of a vehicle body, to low-rigidity section 23, it is possible to increase the attachment rigidity. Further, as shown in FIG. 6(C) or 6(D), by providing a relatively high-rigidity portion 25 or 26, extending obliquely, to low-rigidity section 23, it is possible to increase the torsional rigidity. Furthermore, as shown in FIG. 6(E), by providing a relatively high-rigidity portion 27, extending in the front/rear direction and the traverse direction of a vehicle body, to low-rigidity section 23, it is possible to increase the plane rigidity.

FRP in the bonnet for an automobile means a resin reinforced by reinforcing fibers, and as the reinforcing fibers, except the above-described carbon fibers, for example, inorganic fibers such as glass fibers, and organic fibers such as KEVLAR fibers, polyethylene fibers and polyamide fibers, can be used. From the viewpoint of easy control of plane rigidity of an outer member, etc., particularly carbon fibers are preferred. As the matrix resin of FRP, for example, a thermosetting resin such as an epoxy resin, an unsaturated polyester resin, a vinylester resin and a phenolic resin can be exemplified, and further, a thermoplastic resin such as a polyamide resin, a polyolefine resin, a dicyclopentadiene resin and a polyurethane resin also can be used. Further, as the core material in a case where a sandwich structure is employed, an elastic material, a foamed material or a honeycomb material can be used, and for the purpose of weight lightening, a foamed material is particularly preferred. The material of the foamed material is not particularly limited, and for example, a foamed material of a polymer material such as a polyurethane, an acrylic, a polystyrene, a polyimide, a vinyl chloride, a phenol, etc. can be used. The honeycomb material is not particularly limited, and for example, an aluminum alloy, a paper, an aramide paper, etc. can be used.

EXAMPLES

Example 1

A bonnet was molded at a shape of a bonnet (aspect ratio: 1:about 1.5) for being attached to a vehicle body on the market, so that the center of the front edge became a striker attachment position, the both corners of the rear edge became hinge attachment positions, and it was supported totally at three points. The central portion of the outer member of the bonnet was formed as a single plate structure with a woven fabric (plain weave) using carbon fibers "T300" produced by Toray Industries, Inc. as the reinforcing fibers, and the entire circumferential portion of its outer edge was formed as a sandwich structure formed by placing the above-described T300 woven fabric (plain weave) between a foamed core ("FOAMAC" produced by Sekisui Chemical Corporation) and was made at a higher rigidity than the central portion. The inner member of the bonnet was formed as a hat-shaped bonnet of a single plate structure using the T300 woven fabric (plain weave). In the outer and inner members, an epoxy rein (TR-C35, produced by Toray Industries, Inc.) is impregnated into the T300 woven fabric by RTM (Resin Transfer Molding), cured by heating, the outer circumferential portions were trimmed, and the outer and the inner members were adhered to each other to prepare a CFRP bonnet. When the surface of the prepared bonnet was determined, a bonding line due to the joining with the inner member was not observed on the surface of the outer member. A head impacter simulating a human head with a weight of 3.5 kg was collided with a central portion of this outer member at a speed of 34 km/hr., an acceleration caused on the head impacter, that is, the human head, and its durability were determined by an acceleration meter incorporated into the head impacter, and therefrom, the head injury criterion (HIC) was calculated. The result is shown in Table 1.

Example 2

A bonnet with the same size as that of Example 1 was molded in a manner similar to that in Example 1 other than a condition where a woven fabric (plain weave) using carbon fibers "T700" produced by Toray Industries, Inc. was used as the reinforcing fiber substrate of the outer member of the bonnet. When the design surface was determined similarly as in Example 1, there was no problem. Similarly, the acceleration and its durability were determined, and therefrom, the head injury criterion (HIC) was calculated. The result is shown in Table 1.

Comparative Example 1

A bonnet with the same size as that of Example 1 was molded in a manner similar to that in Example 1 other than a condition where the outer member of the bonnet was formed as a sandwich structure over its entire area in which a foamed core ("FOAMAC", produced by Sekisui Chemical Corporation) was placed between the T300 woven fabrics (plain weave). There was a portion where the core was not positioned along the curved surface on the surface of the bonnet, and a good surface design was not obtained. The collision test of the head impacter was carried out for this bonnet, the acceleration and its durability were determined, and therefrom, the head injury criterion (HIC) was calculated. The result is shown in Table 1.

Comparative Example 2

A bonnet with the same size as that of Example 1 was obtained in a manner similar to that in Example 1 other than a condition where the entire circumference of the outer edge of the bonnet was formed as a single plate structure similar to that in the central portion. When the design feature of the obtained bonnet was determined, observed was a bonding line on the surface of the outer member due to the bonding with the inner member. The result is shown in Table 1.

From Table 1, in Example 1, it was confirmed that, by the structure that is, by providing the high-rigidity section having a rigidity higher than a rigidity of the central portion along the outer edge of the bonnet, the rigidity of a required portion could be efficiently increased without damaging the moldability, the design feature of the surface could be improved, and the performance for protecting a pedestrian at the time of collision accident etc. could be enhanced. Further, in Example 2, it was confirmed that the performance for protecting a pedestrian at the time of collision accident etc. could be further enhanced by using high-elongation carbon fibers.

TABLE 1

|  | Head Injury Criterion | Moldability | Surface Design Feature |
|---|---|---|---|
| Example 1 | ○ | ○ | ○ |
| Example 2 | ◎ | ○ | ○ |
| Comparative Example 1 | X | X | X |
| Comparative Example 2 | — | ◎ | X |

◎: Very good,
○: Good,
X: Bad

INDUSTRIAL APPLICATIONS

The FRP bonnet for an automobile can be applied to any bonnet for an automobile for which a lightness is required as a whole, and a necessary rigidity and an excellent design feature of the surface and in addition an excellent impact absorbing performance are required.

The invention claimed is:

1. A bonnet for an automobile comprising a carbon fiber reinforced plastic containing a woven fabric of carbon fibers having a high elongation, wherein a high-rigidity section having a rigidity higher than a rigidity of a central section of said bonnet is provided to said bonnet along an outer edge of said bonnet.

2. The bonnet according to claim 1, wherein the whole of said bonnet including said high-rigidity section is integrally molded.

3. The bonnet according to claim 1, wherein said high-rigidity section is provided along said outer edge of said bonnet over its entire circumference.

4. The bonnet according to claim 1, wherein said high-rigidity section is partially provided along said outer edge of said bonnet.

5. The bonnet according to claim 1, wherein said high-rigidity section is formed as a thickness increased section in which a number of lamination of reinforcing fiber layers is increased.

6. The bonnet according to claim 1, wherein said high-rigidity section is formed as a sandwich structure in which a core material is interposed between fiber reinforced plastic skin plates.

7. The bonnet according to claim 1, wherein at least a portion other than said high-rigidity section is formed from a fiber reinforced plastic single plate.

8. The bonnet according to claim 1, wherein at least a portion other than said high-rigidity section is formed as a sandwich structure in which a core material is interposed between fiber reinforced plastic skin plates.

9. A bonnet for an automobile having an outer member comprising a carbon fiber reinforced plastic containing a woven fabric of carbon fibers having a high elongation and an inner member made from fiber reinforced plastic and joined to a back-surface side of said outer member, wherein said outer member has a high-rigidity section having a rigidity higher than a rigidity of a central section of said outer member along an outer edge of said outer member, and said inner member is joined to said outer member at said high-rigidity section.

10. The bonnet according to claim 9, wherein the whole of said outer member including said high-rigidity section is integrally molded.

11. The bonnet according to claim 9, wherein said high-rigidity section is provided along said outer edge of said outer member over its entire circumference.

12. The bonnet according to claim 9, wherein said high-rigidity section is partially provided along said outer edge of said outer member.

13. The bonnet according to claim 9, wherein said high-rigidity section is formed as a thickness increased section in which a number of lamination of reinforcing fiber layers is increased.

14. The bonnet according to claim 9, wherein said high-rigidity section is formed as a sandwich structure in which a core material is interposed between fiber reinforced plastic skin plates.

15. The bonnet according to claim 9, wherein at least a portion of said outer member other than said high-rigidity section is formed from a fiber reinforced plastic single plate.

16. The bonnet according to claim 9, wherein at least a portion of said outer member other than said high-rigidity section is formed as a sandwich structure in which a core material is interposed between fiber reinforced plastic skin plates.

17. The bonnet according to claim 9, wherein said inner member extends along said high-rigidity section over the entire circumference of said outer member.

18. The bonnet according to claim 9, wherein said inner member partially extends along said high-rigidity section.

19. The bonnet according to claim 9, wherein said inner member is formed in a hat shape in cross section.

* * * * *